Sept. 25, 1962

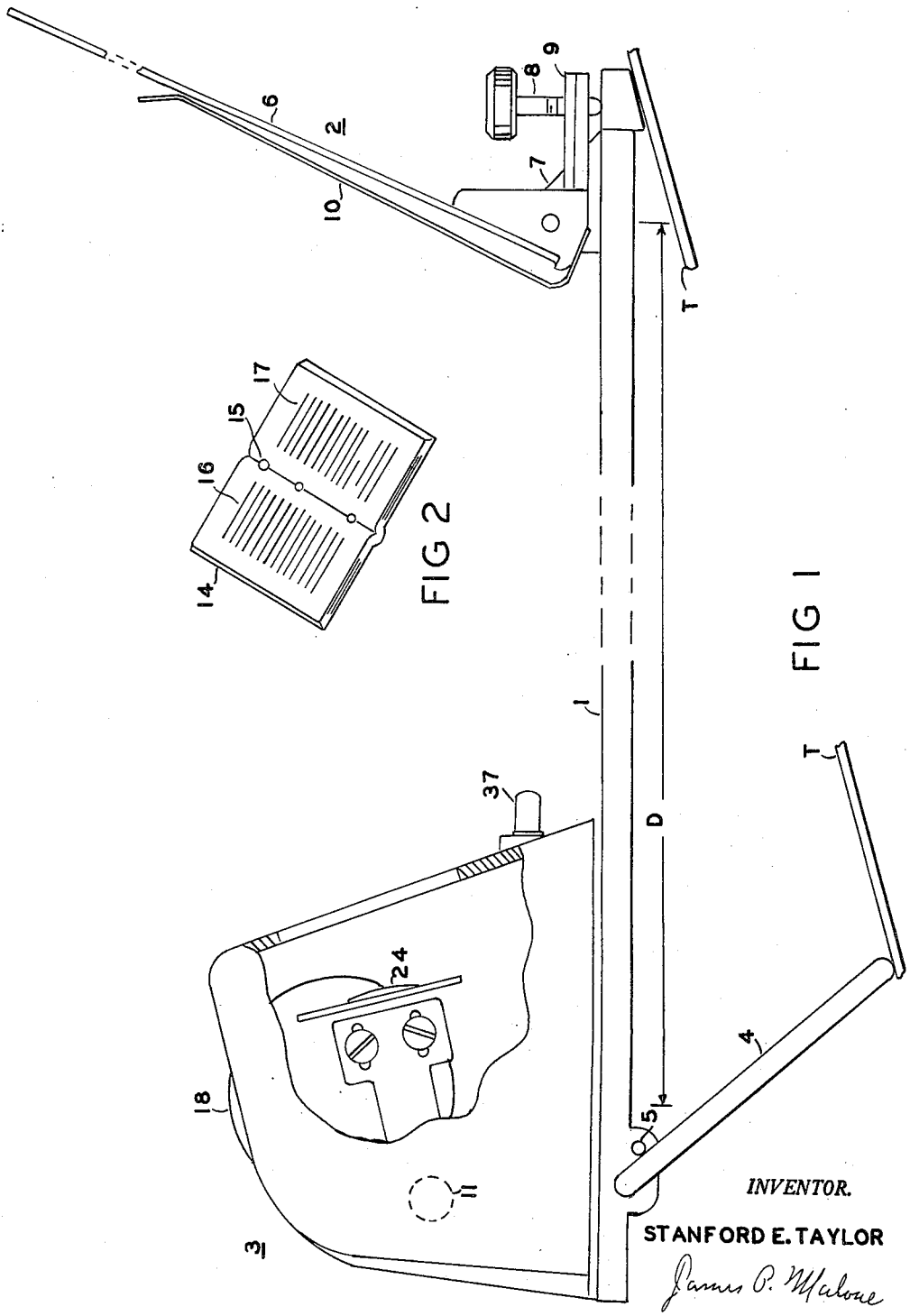

S. E. TAYLOR 3,055,122

TRAINING MEANS FOR SKIMMING

Filed Nov. 17, 1960

INVENTOR.
STANFORD E. TAYLOR
BY *James P. Malone*

United States Patent Office 3,055,122
Patented Sept. 25, 1962

3,055,122
TRAINING MEANS FOR SKIMMING
Stanford E. Taylor, Centerport, N.Y., assignor to Educational Developmental Laboratories, Inc., Huntington, N.Y.
Filed Nov. 17, 1960, Ser. No. 70,078
10 Claims. (Cl. 35—35)

This invention relates to training means for developing techniques of skimming written material in mature or superior readers.

There are four types of reading employed by the superior reader: analytical reading, normal reading, accelerated reading, and scanning or skimming. Skimming may be defined as the process of scanning written material wherein each word is not read but rather the printed material is scanned or sampled with one or more of the specific following purposes:

(1) To preview or get the gist of the material.
(2) To find certain facts, references or generalizations.
(3) To locate new information.
(4) To review or refresh memory.
(5) To answer a specific question.

Skimming generally takes two forms: First, extended skimming involving the perusal of a series of pages of reading material sequentially, furnishing the reader with an overall structure or pattern of the content; or Second, specific-purpose skimming in which the reader is searching for definite information or relationships in answer to a particular answer or need. In the case of the latter he covers the printed material only to the point of locating the information he was seeking.

Accelerated reading for superior readers involves complete perusal of every line of copy and is accomplished in the rate-range of 400 to 600 words per minute, whereas skimming or selective scanning for superior readers usually lies above the range of 700–800 words per minute (above which range inclusive reading is rarely possible, according to available research). However, this does not mean that 700–800 words are "read" per minute but that this much material is dealt with in one fashion or another per minute, on an average. The skimming rate is not often a constant word-per-minute measurement as the nature of the particular skimming task often dictates the rate of coverage.

Since all students are normally taught to read carefully and thoroughly, they naturally develop reading habits from which they must "break away" in order to accomplish effective skimming and in order to develop flexibility in reading. Accelerated reading is characterized by the use of "habits" in reading, in terms of both visual performance skills and the perceptual process. Skimming, on the other hand, represents a deviation from these habits, the reader sometimes perusing the centers of the lines of print, sometimes the right hand portions of the lines, sometimes the left and sometimes employing a sporadic manner of "reading, skipping, reading" attack.

Thus the present invention is based on the premise that skimming is predominantly an organizational process requiring highly developed perceptual skills. The skimmer, therefore, is regarded only as a timer and motivator-reminder. The rate of the device must be well above his reading range, so that he is urged to "break away" from the oculo-motor habits he usually uses in reading and learn to rely on selected perceptual impressions and to organize and relate these impressions quickly and competently.

Conventional apparatus has been developed to stimulate rapid reading of each word. Such devices comprise means to scan a bar of light down a printed page, as shown in Patent No. 2,782,528. However, these devices are not suitable for skimming as they are designed for the user to read all words on each line of print and the field of attention and vision is constrained by means of moving the illuminated light bar to a particular portion of the page. These devices are designed to encourage accelerated regular reading, whereas the skimming skill involves a considerable amount of skipping, which may be irregular, arythmic, and even involve re-reading.

Therefore, to develop the skimming skill, it is necessary that the eye movements not be restricted in any manner. The present device achieves this by scanning a moving dot of light down the margin of the printed page, within the peripheral vision of the reader's eye but in such a manner as not to direct or constrain his eye movements to any predetermined portion of the written material. In addition, it is important to the reader to know the amount of time that he required to complete a skimming exercise both for motivational purposes and as a means for measuring progress. The present device therefore provides a timer dial, calibrated in seconds.

The present device has a predetermined rate in the range of 30 seconds per page, or 800 to 1000 words per minute, depending on the number of words found on pages of the book being used. The rate is not adjustable, since, in extended skimming, the reader would use the moving dot of light merely as a gauge of the remaining reading time for that page, trying to cover the entire page before the dot of light reached the bottom of the page, thus remaining in the skimming range, rate wise. When given specific skimming exercises with this device, the reader would try to find the information requested before the light reaches the bottom of the page, and, having found the information, record the time in seconds required to complete the task. The advantage of the present system is that the reader's eye movements are not confined to any predetermined pattern, and he is not directed to any predetermined portion of the reading matter. However, the peripheral monitor tends to keep the reader from lapsing into reading habits. Further, the operation of this system is automatic in that the monitoring bead of light returns to the top of the page after having scanned down the page, and a momentary two second pause is provided when the bead returns to the top of the page, allowing the reader time to turn the pages.

Accordingly, a principal object of the invention is to provide new and improved means to develop skimming skill or flexibility in reading.

Another object of the invention is to provide new and improved training means for skimming, comprising a peripheral-vision monitor.

Another object of the invention is to provide new and improved means for timing the scanning of printed material without interfering with the eye movements of the reader.

Another object of the invention is to provide new and improved means for timing the scanning of printed material without interfering with the perceptual or organizational approaches of the reader.

Another object of the invention is to provide new and improved training means for scanning or skimming which permits arythmical eye movement, re-reading, or other irregular skimming patterns which occur in scanning rates above 800 to 1000 words per minute.

Another object of this invention is to provide a highly portable individual and inexpensive means for training skimming skills.

These and other objects of the invention will be apparent from the following specification and drawings, of which FIGURE 1 is an elevation view of the embodiment of the invention.

FIGURE 2 is a diagram illustrative of the operation of the invention.

Figure 4:
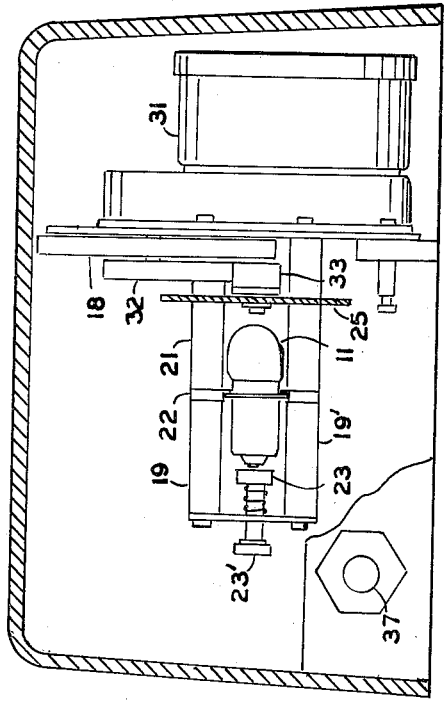
FIGURE 4 is a front view partially in section of the embodiment of FIGURE 3.

Referring to the figures the invention generally comprises a base or frame member 1 having book holding means 2 and a scanning light generator 3. The base or frame 1 rests on a table top T so that the reading material is preferably at an angle below the horizontal which has been found to be the most comfortable angle for reading. The scanning generator 3 is elevated above the table top by means of the leg loop 4 which is rotatably mounted in the frame 1 and positioned by means of the pin 5. The bookholder 2 is adapted to fold down against the scanning generator 3 for convenient portability and the leg loop 4 may be rotated around into the plane of frame 1 to provide a convenient carrying handle.

More specifically, the bookholding means comprises a plate 6 which is rotatably mounted on a bracket 7 fixed to the frame base 1. The angle of the holder 6 may be adjusted by means of the screw 8 which is threaded into bracket 9 which is connected to the plate 6. This provides different scanning distances for different size books. A pair of holding clips 10 are provided to hold the printed material on the plate 6. The scanning generator generally comprises a fixed position light bulb 11 and a scanning lens 24 which is adapted to focus a moving light dot on the printed material in the holder 2. A normally closed push button switch 37 is provided for stopping both the light and motor, in case the reader is behind the scanning dot at the bottom of a page.

Referring to FIGURE 2 there is shown a book 14 which, when held in the holder 2, would receive the moving dot 15. The dot does not impinge on any portions of the written material 16 or 17 but scans down the page within the margin and within the peripheral vision of the reader without interfering with his ability to skip forwardly or backwardly to any portion of the printed material.

A timing dial 18 is also provided and it has the seconds numbered on its periphery. The motor drive, it will be explained, is unidirectional and the timing dial may be used to reset the dot as soon as the reader completes his task on a page. This occurs when it is desired to scan only a portion of a page, or if the reader is ahead of the dot at the bottom of a page, or for some other special purpose. A typical dimension D from the center of the scanning dial to the bookholder is of the order of 10½". The frame 1 may be made telescoping to vary this distance.

Figure 5:
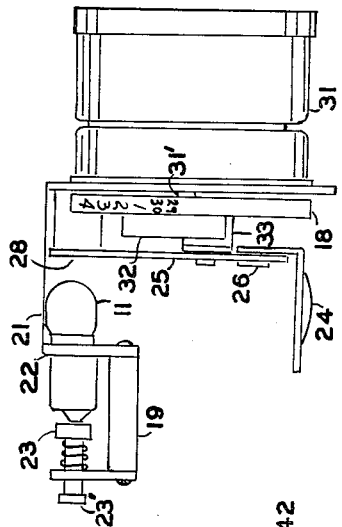
FIGURE 5 is a detail top view of the embodiments of FIGURES 3 and 4.
Figure 3:
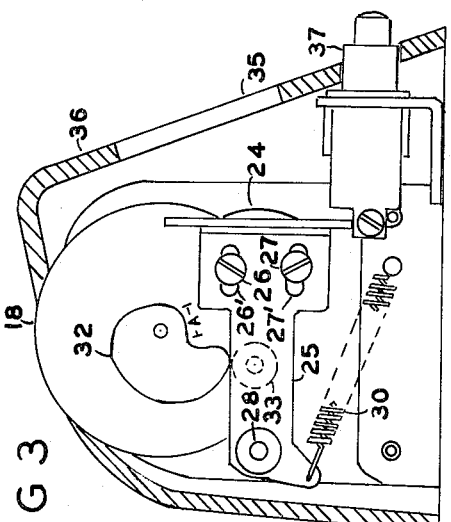
FIGURE 3 is a side view partially in section, of an embodiment of the invention.

FIGURES 3, 4 and 5 show details of the scanning generator. The light is provided by the bulb 11 which is fixedly mounted to the frame member 21 by means of the socket connection 22. The bulb is held in socket 22 by spring loaded terminal 23 which may have a screw adjustment 23'. Terminal 23 is insulated from the frame by insulators 19 and 19'. The base of the bulb may be the ground potential with the other voltage line applied to the terminal 23 which is connected to the center pin at the bottom of the bulb.

The lens 24 is adjustably mounted on the bracket 25 by means of the screws 26 and 27 and the adjustment slots 26' and 27' in the bracket 25. The bracket 25 is pivotally mounted to the frame by the pin 28 and is spring loaded to the frame by means of the spring 30.

The scanning motion of lens 24 is provided by means of the motor 31 having a cam 32 mounted on its shaft 31'. The motor is preferably a small synchronous motor with a conventional one-way clutch built in so that it is unidirectional. The cam follower 33 on the bracket 25 rides on the cam 32 and the numbered scanning dial 18 is fixedly connected to the cam 32. The cam 32 has a spiral shape with a quick return stroke. A dwell portion A is provided on the cam to cause a momentary dwell at the top of the page to provide time for turning the pages.

In operation, when the device is energized by being plugged in to a wall socket the motor will run and the light will be transmitted through the slot 35 in the housing 36 onto the reading material mounted on the holder 2. The reading material is then adjusted so that the scanning dot will move on the margin of the printed material within the peripheral vision of the reader. The light may be turned off and the motor stopped at any time by means of the normally closed momentary push button switch 37 which opens when it is pushed in.

The reader would select the proper page, and, when the scanning dot starts down the page, he would commence skimming. When the scanning dot reached the bottom of the printed material the reader should also have reached that point. After a few pages he will be able to accommodate his skimming to the desired rate.

As the motor shaft rotates, the lens bracket 25 rides on the cam 32 to provide the scanning motion. At the same time the numbered dial 18 rotates giving an indication of the number of seconds elapsed on the particular page. The numbered dial 18 extends above the housing 36 and may be used to reset the moving dot to the top of the page. For instance, if there is only a half page at the end of a chapter, rather than wait for the dot to traverse the remaining blank portions of the page the number dial 18 may be moved with the finger rapidly to the top of the page. However, since the motor is of the type having a conventional one-way clutch, the light beam can only be moved in the forward direction and not in the reverse direction. The light bulb may be a flash light type, for instance, a 2.7 volt bulb. The voltage may be reduced to approximately 2 volts to cut down the brilliancy and also to increase the life of the bulb. The motor is preferably a conventional 115 volt synchronous motor with unidirectional clutch which operates at approximately 2 r.p.m. The lamp voltage may be provided by using the field windings of the motor as a transformer primary or by any other conventional manner.

Figure 6:
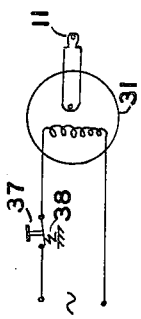
FIGURE 6 is a schematic circuit diagram.

FIGURE 6 shows a typical circuit arrangement. Spring 38 holds push button switch 37 normally closed.

Figure 7:
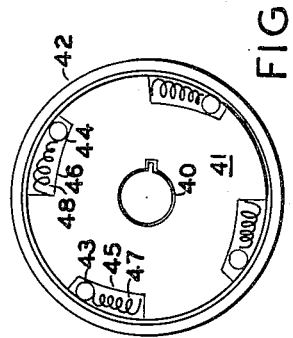
FIGURE 7 is a detail view of unidirectional clutch.

FIGURE 7 illustrates a typical conventional overrunning or one-way clutch. The input shaft 40 is fixedly connected to the web 41 and the output shaft is connected to the outside drum 42. The balls 43, 44, etc. are mounted in the tapered slots 45, 46, etc. and spring loaded by means of the springs 47, 48. etc. The inner shaft 40 drives the output drum forward in the clockwise direction because of the wedging action of the balls between the tapered slots and the outside drum. If the outside drum 42 is separately rotated forward by dial 18 connected thereto the ball will pinch or wedge to and drive the inner shaft. However, if the output drum 42 is rotated counterclockwise the balls will roll out of engagement.

The one-way clutch may also be provided by winding a spring around the output shaft and connecting an extending arm of the spring to the input shaft. The spring is wound so that when the input shaft is driven in the forward direction the spring tightens to drive the output shaft but loosens in the reverse direction so that there is no drive. Therefore, the output shaft can be separately advanced and carry the input shaft with it but cannot reverse the input shaft.

Many modifications may be made by those who desire to practice the invention without departing from the scope thereof which is defined by the following claims:

I claim:

1. Training means for skimming printed material comprising means to hold printed material, and means to scan a moving visual indicator down the margin of but spaced from said printed material and within the peripheral vision of the reader at a rate said printed material being maintained at a uniform light intensity.

2. Training means for skimming printed material, comprising means to hold printed material, means to scan a moving dot down the margin of but spaced from said printed material within the peripheral vision of the reader, at a predetermined rate said printed material being maintained at a uniform light intensity.

3. Training means for skimming printed material, comprising means to hold printed material, means to scan a moving dot down the margin of said printed material within the peripheral vision of the reader, said scanning means comprising a source of light located a predetermined distance from said holding means, a movable prefocused lens adapted to direct the light beam from said light onto said printed material and means to automatically scan and return said lens comprising a cam and a unidirectional motor connected to said cam.

4. Apparatus as in claim 3, wherein said cam has a dwell portion to momentarily stop said scanning beam at the top of a page to permit time for turning pages.

5. Training means for skimming printed material, comprising a base, means to hold printed material on said base, means on said base to scan a moving dot down the margin of said printed material within the peripheral vision of the reader, said scanning means comprising a source of light located a predetermined distance from said holding means, a movable lens adapted to direct the light beam from said light onto said printed material, means to scan said lens comprising a cam and a unidirectional motor connected to said cam, and timing dial means connected to said cam, said dial being calibrated in seconds.

6. Apparatus as in claim 5 wherein said dial and cam are connected to said motor with a unidirectional clutch whereby said dial and cam may be advanced at any time by the operator.

7. Apparatus as in claim 6 wherein said means to hold printed material includes means for adjustably tilting the angle of said printed material to alter the distance of scanning for different size books or material.

8. Apparatus as in claim 7 having combined leg and handle means rotatably connected to said base and wherein said material holding means folds down for convenient carrying.

9. Apparatus as in claim 8 having a normally closed push button suitably connected to stop said scanning indicator and turn off said light at any point.

10. Training means for skimming printed material, comprising means to hold printed material, means to scan a moving dot down the margin of said printed material within the peripheral vision of the reader, said scanning means comprising a source of light located a predetermined distance from said holding means, a movable prefocused lens adapted to direct the light beam from said light onto said printed material and means to automatically scan and return said lens.

References Cited in the file of this patent

UNITED STATES PATENTS

| | | |
|---|---|---|
| 2,287,345 | Erickson | June 23, 1942 |
| 2,782,528 | Wastl | Feb. 26, 1957 |
| 2,865,114 | Pearce | Dec. 23, 1958 |